(12) United States Patent
Bettesworth et al.

(10) Patent No.: US 11,005,912 B2
(45) Date of Patent: *May 11, 2021

(54) COORDINATION OF WEBPAGE PUBLICATION

(71) Applicant: INTERNATIONAL BUSINESS MACHINES CORPORATION, Armonk, NY (US)

(72) Inventors: Gary S. Bettesworth, Basingstoke (GB); Andreas Martens, Fair Oak (GB); Sam Rogers, Eastleigh (GB); Paul S. Thorpe, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,273

(22) Filed: Aug. 27, 2019

(65) Prior Publication Data

US 2019/0387044 A1 Dec. 19, 2019

Related U.S. Application Data

(63) Continuation of application No. 15/408,023, filed on Jan. 17, 2017, now Pat. No. 10,616,305.

(51) Int. Cl.
*H04L 29/08* (2006.01)
*G06F 40/14* (2020.01)
(Continued)

(52) U.S. Cl.
CPC ............ *H04L 67/02* (2013.01); *G06F 40/117* (2020.01); *G06F 40/14* (2020.01); *G06F 40/197* (2020.01)

(58) Field of Classification Search
CPC ... H04L 67/02; G06F 17/2288; G06F 17/218; G06F 17/2247
See application file for complete search history.

(56) References Cited

U.S. PATENT DOCUMENTS 8,832,387 B2* 9/2014 Martin ................. G06F 16/217
711/141
9,165,308 B2 10/2015 Cook
(Continued)

OTHER PUBLICATIONS

Hinton, S., "From Home Page to Home Site: Effective Web Resource Discovery at the ANU," http://www7.scu.edu.au/1828/com1828.htm, downloaded from internet Aug. 30, 2016, pp. 1-10.
(Continued)

*Primary Examiner* — Kim T Nguyen
(74) *Attorney, Agent, or Firm* — William A. Kinnaman, Esq.; Wayne F. Reinke, Esq.; Heslin Rothenberg Farley & Mesiti P.C.

(57) ABSTRACT

Managing the timing of publication of new webpages and in particular new versions of existing webpages. New webpages are uploaded into a data repository for storing them before they are made available for access externally. A dependency processor is provided to process these new webpages to assess their readiness for publication by checking for dependencies on other webpages, the dependencies including a mutual dependency; locating any of the other webpages; and ascertaining whether each such dependency is satisfied. If dependencies are satisfied, then the new webpage is deemed ready for publication and is published. The satisfied dependencies include the content being accessible. In the case that the new webpage is a new version of an existing webpage, it replaces the old version. If dependencies are not satisfied, then the new webpage is held back until such time as they are met.

20 Claims, 5 Drawing Sheets

(51) Int. Cl.
*G06F 40/117* (2020.01)
*G06F 40/197* (2020.01)

(56) References Cited

U.S. PATENT DOCUMENTS

| | | | |
|---|---|---|---|
| 10,616,305 B2* | 4/2020 | Bettesworth | G06F 40/117 |
| 2006/0069745 A1* | 3/2006 | Boyles | H04L 67/36 |
| | | | 709/218 |
| 2006/0212792 A1 | 9/2006 | White | |
| 2006/0265647 A1 | 11/2006 | Nicholas et al. | |
| 2007/0136298 A1* | 6/2007 | Crockett | G06F 16/9566 |
| 2012/0272228 A1 | 10/2012 | Marndi | |
| 2012/0331409 A1 | 12/2012 | Olliphant | |
| 2013/0086323 A1 | 4/2013 | Kadlabalu | |
| 2014/0068413 A1 | 3/2014 | Christensen | |
| 2014/0250364 A1 | 9/2014 | Sundermeyer | |
| 2016/0191608 A1 | 6/2016 | Zaid | |
| 2018/0205780 A1 | 7/2018 | Bettesworth | |

OTHER PUBLICATIONS

List of IBM Patents and Patent Applications Treated as Related Dated Aug. 27, 2019.

Netravali, Ravi et al., "Polaris: Faster Page Loads Using Fine-grained Dependency Tracking," http://web.mit.edu/ravinet/www/polaris_nsdi16.pdf, downloaded from Internet Nov. 16, 2016, pp. 1-14.

* cited by examiner

COORDINATION OF WEBPAGE PUBLICATION

This application is a continuation of co-pending U.S. patent application Ser. No. 15/408,023, entitled "COORDINATION OF WEBPAGE PUBLICATION," filed Jan. 17, 2017, which is hereby incorporated herein by reference in its entirety.

BACKGROUND

One or more aspects of the present disclosure relate to the publication of webpages across single or multiple websites to ensure that updates are published in a coordinated and self-consistent manner.

Often within an organization the publishing of a number of webpages within a web domain or on different websites is to be controlled so that it happens simultaneously. This can be difficult to coordinate within a large organization when a number of individuals, departments, locations and/or divisions own and control different webpages on different sites. Such pages are often managed and published using different software tools, across different countries, in different time zones.

For example, this makes it difficult to coordinate the availability of a product for sale or the 'go live' of a marketing campaign, especially when ownership of the information on the webpages and/or of the webpages themselves is dispersed, i.e. distributed. In the case of a product release, what is desired is that the marketing, the systems requirements, the downloadable code and the blogs on different web sites are all made available simultaneously to avoid customer confusion, broken web links etc.

SUMMARY

Shortcomings of the prior art are overcome and additional advantages are provided through the provision of a computer-implemented method to manage a timing of publication of new webpages. The computer-implemented method includes receiving at least one webpage to make available for access; and processing, by at least one web server, the at least one webpage to assess its readiness for publication, the processing including: checking the at least one webpage for dependencies on other webpages; locating one or more of the other webpages, based on the checking indicating dependencies, the dependencies comprising at least one mutual dependency between the at least one webpage and another webpage of the one or more of the other webpages; and ascertaining whether the dependencies are satisfied, wherein the at least one webpage is made available for access conditional on the dependencies being satisfied, resulting in satisfied dependencies and wherein the satisfied dependencies comprise the content being accessible.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

In the following, aspects of the present invention will further be described by way of example only with reference to example embodiments illustrated in the figures.

DETAILED DESCRIPTION

In the following detailed description, for purposes of explanation and not limitation, specific details are set forth in order to provide a better understanding of aspects of the present disclosure. It will be apparent to one skilled in the art that aspects of the present disclosure may be practiced in other embodiments that depart from these specific details.

Figure 1:
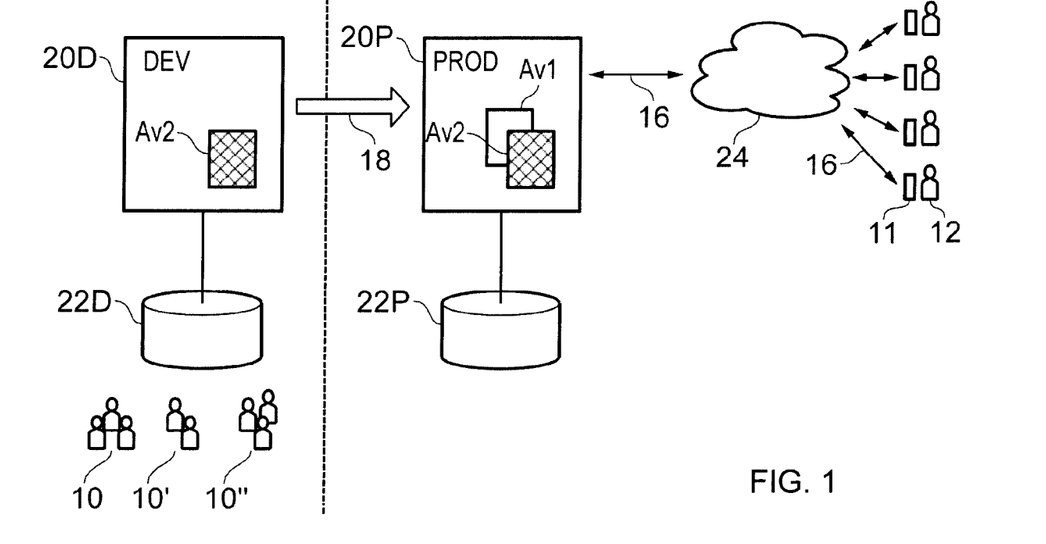
FIG. 1 is a schematic representation of a system environment for embodiments of the invention.

FIG. 1 is a schematic representation of a system environment for embodiments of the invention. A development (web) server 20D is replicated by a production (web) server 20P. Each server 20D, 20P has its own data repository 22D, 22P for storing content and other data. The production server 20P makes available, i.e. serves, webpages through communication paths 16 via the world wide web 24, or some other network such as an intranet, to computer devices 11 of site visitors 12. The computer devices may be end user devices, such as hand held smart phones or tablets, or personal computers, or any other kind of computer including mainframes or server farms. The development server 20D is worked on jointly by a multidisciplinary team of developers 10, marketing experts 10' and subject matter experts 10" with the work product being new versions of existing webpages, which are destined for the production server 20P once their development is complete, where they replace the existing versions of the same pages. This transition is shown by the arrow 18 which may be described as the development server publishing the new page versions to the production server, but more precisely is the development server requesting that the production server publish the new version of the webpage, subject to checking that the dependencies are satisfied. The transfer of the new version of a webpage can also be described as the production server uploading the new page version. For example, version 1 of a page A, denoted as Av1, is initially served by the production server, and once a version 2 of page A, denoted Av2, has been finished by the development team, it is sent from the development server 20D to the production server 20P in order to replace Av1. However, if there are multiple development teams, then a need to coordinate their work arises.

So long as the development team shown in FIG. 1 is the only development team, there should not be any issues in respect of page dependencies in the live, i.e. production system, since the specification should be tight and in any case testing of the development system should reveal any unsatisfied page dependencies.

Figure 2:
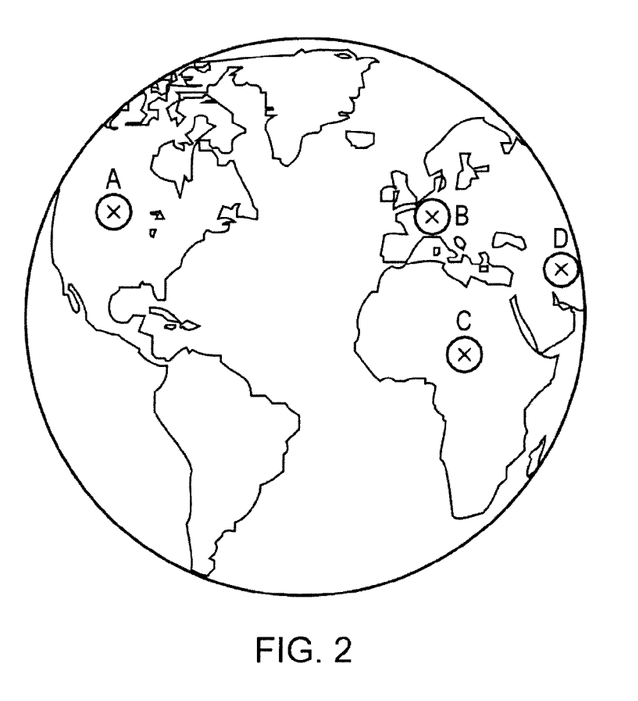
FIG. 2 is a schematic diagram of the globe showing distributed clusters in different time zones.

FIG. 2 is a schematic diagram of the globe showing distributed clusters in different time zones, where each of the clusters A, B, C and D represents a development and production site as shown in FIG. 1. Suppose now there are several development teams, four in this example, each developing updates to their 'own' website, websites A, B, C and D, but actually each of the websites contain much common data, since they are all from the same multinational organization selling a common core of products in their respective regions, each of the core products having a single stock control and single geographical origin, but with regional variations such as currency and language. To ensure quality in the absence of any additional function, the development team at one of the clusters would take on a leadership and policing role, or perhaps the development servers would be tested together before any new webpages were published to the production servers.

Figure 3:
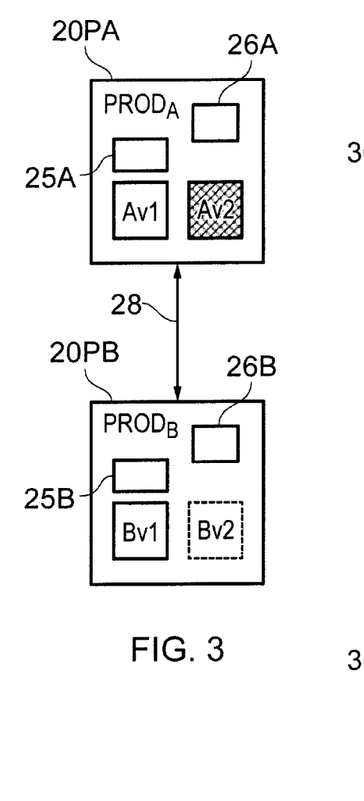
FIG. 3 is a schematic representation of two web servers according to an embodiment of the invention.

FIG. 3 is a schematic representation of two production web servers 20PA and 20PB according to an embodiment of the invention which may be sited at the sites A and B of FIG. 2 for example. Web server 20PA holds a current version Av1 and a new version Av2 of webpage A. Web server 20PB holds a current version of webpage B, Bv1. Each web server has its own data repository 25A/B for storing new, as yet unpublished versions of webpages and also a dependency processor 26A/B which is responsible for checking that the dependencies of new webpages are satisfied. The servers are connected by a communication line 28 for exchanging dependency information, which may be via the world wide web or another network, or may be a proprietary connection, such as a point-to-point connection, or through a telephone network, for example.

A role of the dependency processor is to manage the timing of the publication of new versions of webpages which the server hosts by checking whether a new version which it possesses but has not yet published is suitable for publication. Taking the example of a new version of page A being held in the data repository 25A, the dependency processor is programmed to check the new version of page A for dependencies to other webpages. Specifically, a dependency of one webpage on another webpage can be marked up within the HTML (HyperText Markup Language) of the dependent page. These dependencies could be described in the HTML using simple variables like PRODUCT_A_GA or MARKETING_CAMPAIGN_A. In this example, the dependency processor of server A finds a dependency to webpage B which it locates as being hosted by server B by sending an HTTP (HyperText Transfer Protocol) request to server B. That is, the HTML of version 2 of page A describes a dependency with a URL which points to webpage B on server B. The dependency processor of server A then determines whether this dependency is satisfied based on an HTTP response received back from the other server in response to the HTTP request. Version 2 of webpage B is required to satisfy the dependency specified in the HTML of version 2 of webpage A, but as indicated by the dashed line box in FIG. 3, page Bv2 is not yet present. Until such time as page Bv2 is available, visitors browsing webpage A will be served version 1 of this page, i.e. Av1. At this point, the dependency processor is in a position where it knows whether the dependency on page B is satisfied. If it is satisfied, then server A can replace version 1 of page A with version 2 safe in the knowledge that there will not be any dependency errors. On the other hand, if the HTTP response indicates a broken link or other dependency problem (or there is no response to the HTTP request), then nothing is changed, i.e. the existing version is still available. If this is the state of affairs, then the dependency processor can repeat the verification process to see if the dependency has become satisfied until such time as it is. This repetition may be periodic and/or forced each time there is a page request to the server for webpage A, i.e. a webpage for which a newer version exists that has not yet been published. Thus, once server B has been modified to satisfy the dependency, version 2 of page A will be published by server A. It is also possible that in turn webpage B on server B has a dependency to another webpage on a different server, in which case the roles would play out in the same way as just described, i.e. webpage B has a dependency in its HTML which is to be satisfied before Bv2 can be made available for browsing. That is, an unsatisfied dependency from webpage A to B may cascade, if an affected part of webpage B is dependent on a webpage C (or back to webpage A) and so forth, where 'affected part' means an element which has a non-satisfied dependency.

The dependency processor may be triggered to process a new version to assess its readiness for publication in response to various inputs. The act of loading a new version into the data repository may for example trigger the dependency processor, as might the request for a webpage for which a new, as yet unpublished version exists in the data repository, as might a periodic check, e.g. daily, hourly or more frequently, depending on the time sensitivity of the content and its coordination across different sites.

Various updating scenarios are now described with reference to messaging diagrams showing messaging between first and second production servers and, where applicable, their respective development servers.

Figure 4:
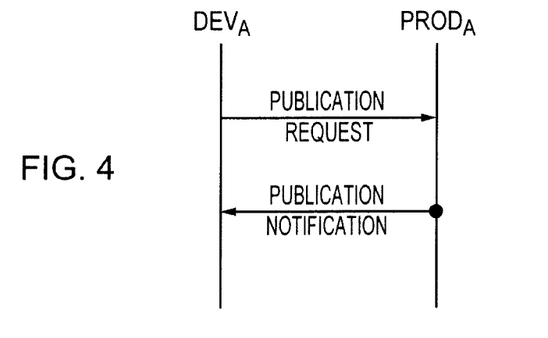
FIG. 4 is a messaging diagram showing a simple webpage update where the new version of the webpage has no dependencies.

FIG. 4 is a messaging diagram showing the most simple scenario of a webpage update where the new version of the webpage has no dependencies. Development server A (DEVA) sends a new version of a webpage A to production server A (PROD$_A$) for publication. Production server A checks for dependencies to webpages hosted by other servers and finds there are none, so proceeds with publishing the new version of webpage A, i.e. replacing the old version of the webpage A, i.e. Av1, with the new version Av2. The point of publication is shown by the solid circle. It is noted the same messaging sequence would follow if there were some dependencies, but they were all to webpages hosted by development server A and they were all satisfied. As well as publishing the new page version, production server A may also be configured to notify development server A of the publication as illustrated, although this notification is optional. For example, the development server may assume that publication will follow, or may independently check for publication if it wants to or needs to by directly accessing the webpage on production server A.

Figure 5:
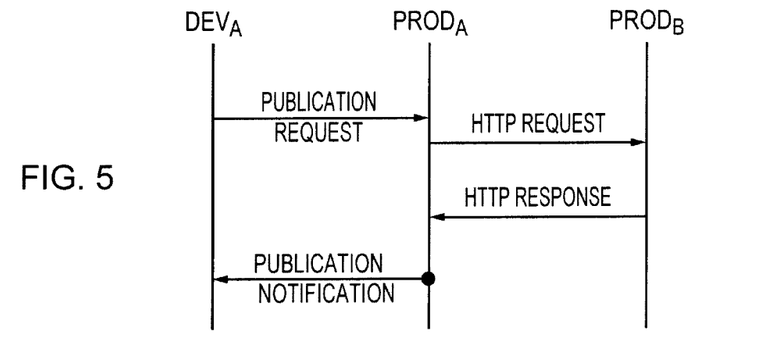
FIG. 5 is a messaging diagram showing a webpage update where the new version of the webpage has a dependency to a webpage hosted by another web server, which is checked and found to be satisfied.

FIG. 5 is a messaging diagram showing a webpage update where the new version of webpage A has a dependency to a webpage hosted by web server B (PROD$_B$), which is checked by sending an HTTP request containing a URL which uniquely identifies the webpage which production server A is interested in (e.g., hostname, port, path and filename). Production web server B then sends an HTTP response to production server A containing the HTML of production server B's dependent webpage, similar to what happens when a browser requests a webpage. On receipt of the HTML of the dependent page in the HTTP response, production server A can then check whether the dependencies are satisfied and, if yes, proceed to publish the new version and notify development server A accordingly. It is noted that essentially the same procedure would be followed if both webpages were hosted on the same server, i.e. production server A in this example. All that would change is that the inter-server communication would not be necessary.

Figure 6:
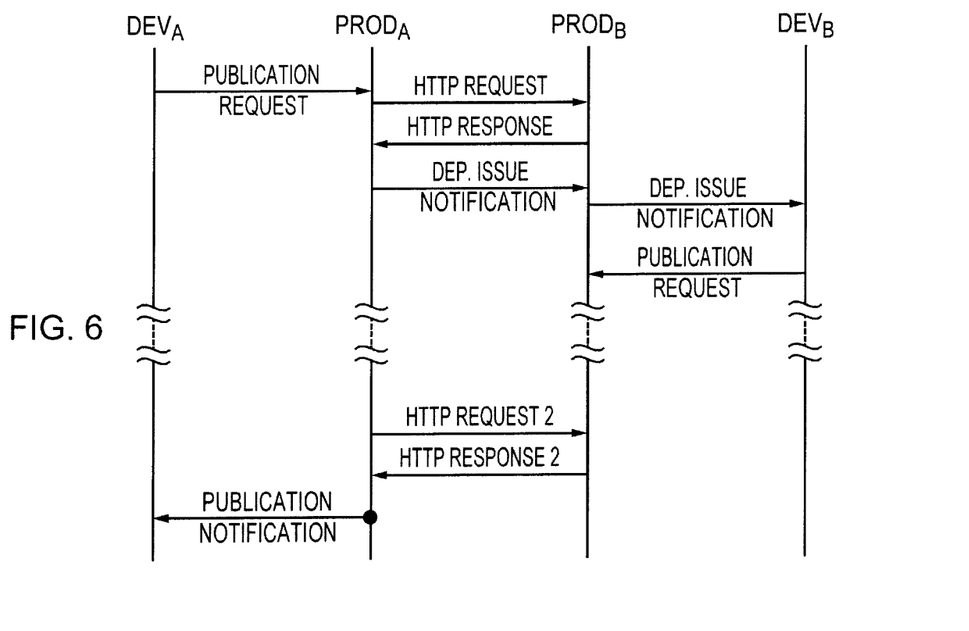
FIG. 6 is a messaging diagram showing a webpage update where the new version of the webpage has a dependency to a webpage hosted by another web server, which is checked and found not to be satisfied, resulting in a requirement for modification to satisfy the new dependency.

FIG. 6 is a messaging diagram showing a webpage update where, like in the FIG. 5 scenario, the new version of the webpage has a dependency to a webpage hosted by another web server. As in the FIG. 5 example, following receipt of a new webpage for publication, production server A messages production server B with an HTTP request asking for the dependent webpage which is then returned with the HTTP response. Upon testing the dependencies, production server A finds they are not met. Production server A may then notify production server B of this incompatibility between the webpage it wishes to publish and the dependent page hosted by production server B. Production server B may then in turn notify its development server ($DEV_B$), which may in turn cause the development team at development server B to develop a new version of their dependent webpage which resolves the issue. Once ready, the new version of the dependent webpage is uploaded to and published by production server B by a suitable publication request. (Here it may be envisaged that production server B goes through the same process itself for checking that the new version of its webpage is ready for publication, i.e. all its dependencies function. However, for ease of understanding these steps are not shown.) Now, at some time later, a subsequent check by production server A (labeled HTTP REQUEST 2), for example one triggered by an external browser request to that webpage address, will generate an HTTP response (labeled HTTP RESPONSE 2), and, upon dependency checking, it will be found that the dependencies are satisfied. This will result in production server A being able to publish its new webpage version and notify the development server A accordingly.

These examples show that the provision of the dependency processing capability in the production web servers effectively takes over management of the coordination of publication updates in an automated way, and specifically removes this management role from the domain of the development teams which would otherwise have to manage the problem themselves in a non-automated way. When a new version of a webpage is published to a web server, the server interprets the described metadata and will only make the page or specific content on a page available for users to browse once all the dependencies which are marked up are resolved. Modifying web servers to perform this function offers webpage content providers a very light weight and decentralized way of managing web dependencies and ensures that all information is in place before publishing. The proposed approach would work on Dynamic and Static page requests—controlling the release of complete webpages or webpages that are only modified in respect of specific content on the page.

A specific example is as follows:

A web server serves a webpage called example.html.

A new version of this page is uploaded to the web server in an 'upload' directory. In one example, only the web server has permission to read uploaded files in this directory— controlled by the operating system (e.g., UNIX file permissions).

The updated version of this example.html document describes a dependency on another webpage being served by another or the same web server. This dependency is to be satisfied before the document will be published by the web server.

The dependency could be described in HTML using the meta data tag, for example as follows:

```
<head>
<title>example.html</title>
<meta name="dependent-url"
content="http://www.another_server.com/dependency-document.html"
/>
<meta name="dependent-text-content"
content="PRODUCT_A_AVAILABILITY" />
</head>
``` where
<dependent-url> identifies the URL of the webpage which is searched to determine if the dependency is met. In this case webpage 'http://www.another_server.com/dependent-document.html' is located on the web and searched;
and
<dependent-text-content> identifies the text which needs to be located within the HTML returned by the web server described in the meta data before the dependency is considered to be met. In this case the returned page is to contain the text 'PRODUCT_A_AVAILABILITY'.

The web server obtains and parses the HTML document described in the meta tag (i.e., the dependent-URL document).

If the dependency is met (i.e., it can find the dependent-text-content in the dependent-URL), the server overwrites the existing example.html document which it currently serves with the new version of example.html. The updated page is then returned to any requesters, e.g. browsers.

If the dependency is not met, then the original example.html page is returned to any requestors by the web server and the new uploaded page remains 'hidden' by the web server and only made available by the server once the dependency is met.

In this case where the dependency is not met, each time example.html is requested, the processing outlined above (obtaining and processing the dependent HTML) is repeated by the server, i.e. the server re-checks to see if the dependency has been met and, if it has been met, the example.html document should be updated and made available to requesters.

Figure 7:
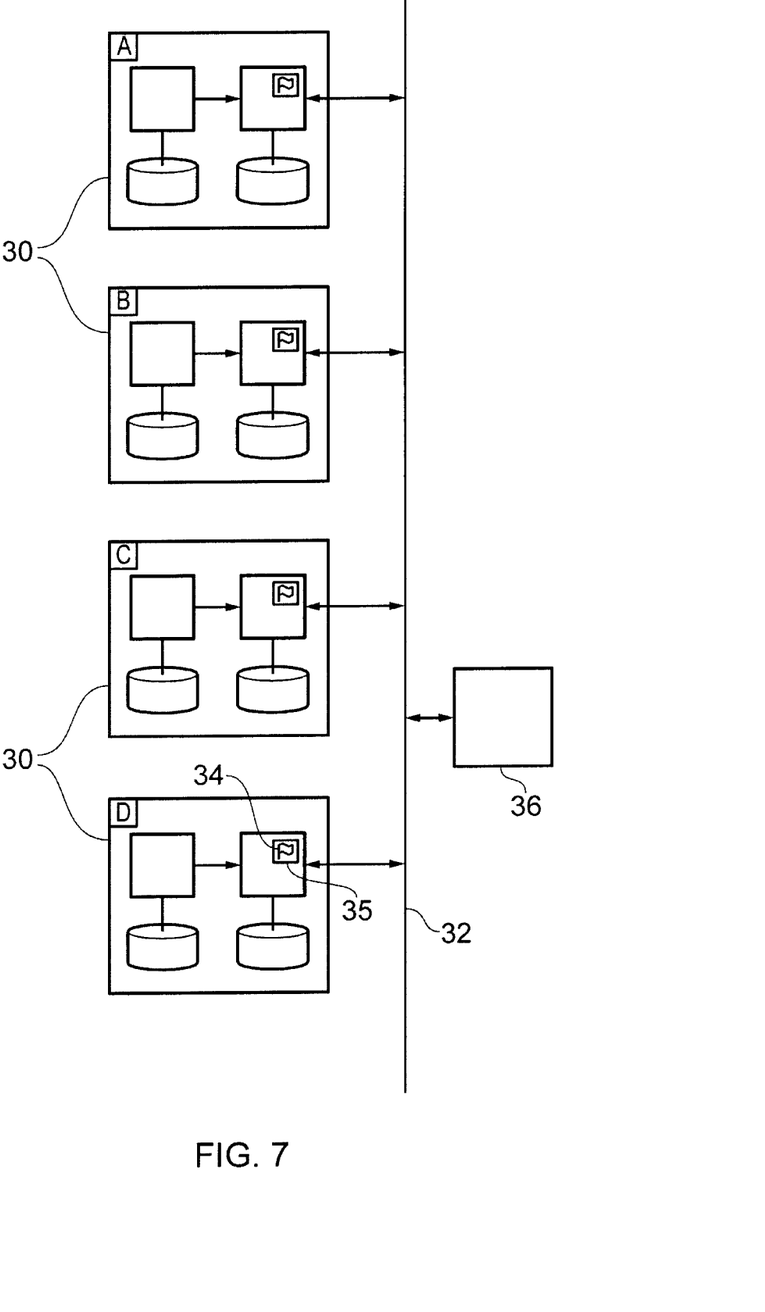
FIG. 7 shows four clusters according to an embodiment of the invention.

FIG. 7 shows four clusters 30 according to an embodiment of the invention. Each cluster comprises a development and production part as shown in FIG. 1 and may represent each of the sites A to D shown in FIG. 2. The four clusters 30 are interconnected by a communication path 32 which may be of any type and incorporate both inter-cluster communication as carried out by path 28 of FIG. 3 and serving of webpages to browsing users as shown by path 16 in FIG. 1. A web master server 36 is also part of the cluster, the role of which is described further below. Each production server is also shown having a flag 34 stored in an associated memory 35, the roles of which are also described further below.

Figure 8:
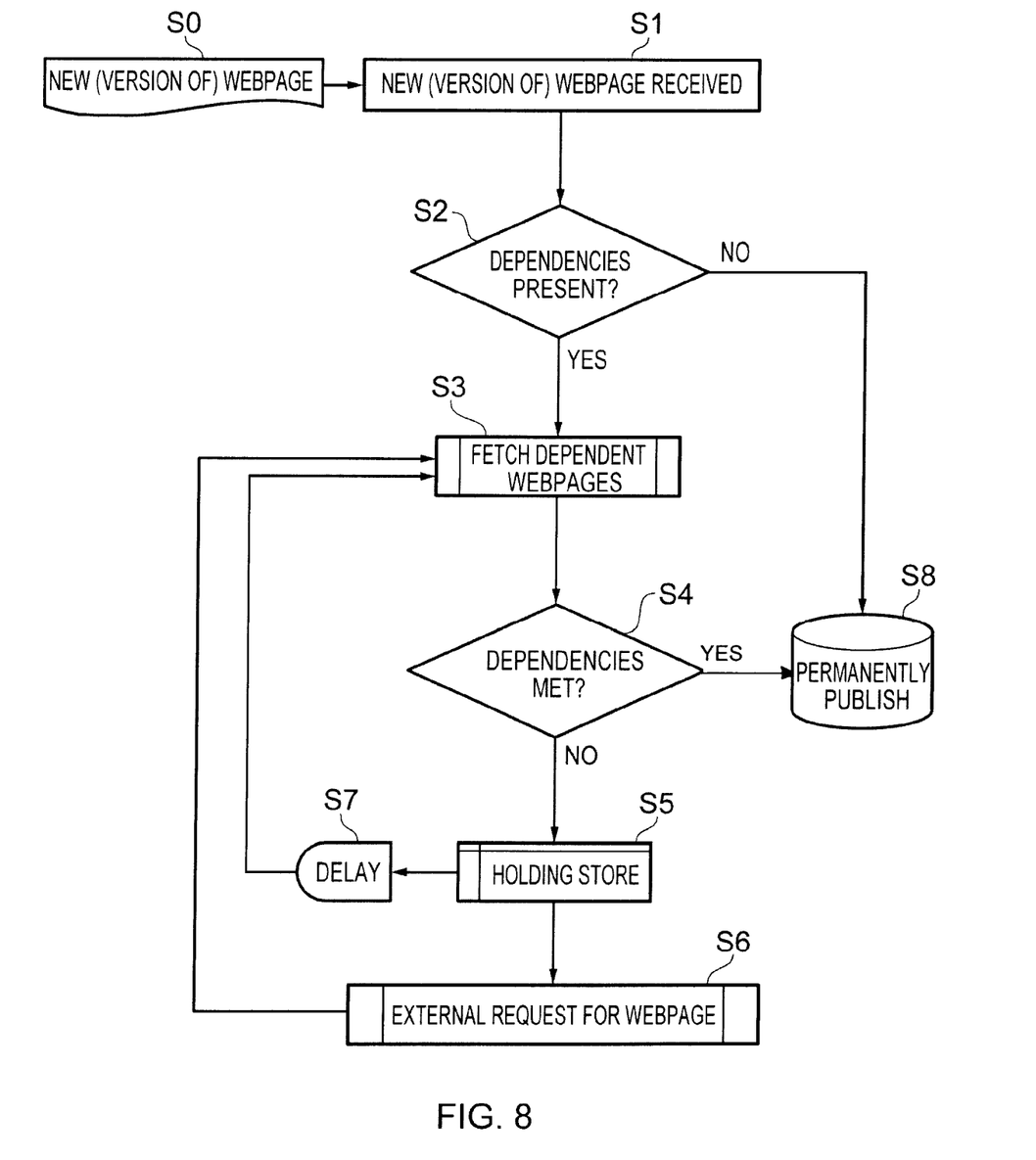
FIG. 8 is a flow diagram showing the steps of the process flow performed by the dependency processor of the web server according to an embodiment of the invention.

FIG. 8 is one example of a flow diagram showing the steps of the process flow performed by the dependency processor of the web server according to an embodiment of the invention.

In Step S0, a new webpage is created, which may be a new version of an existing webpage or an entirely new webpage with no previous version. (One way to deal with new webpages without previous versions, would be to treat it in the implementation as a new version of a blank or empty webpage. A browsing attempt to access a new webpage would also be trapped with a different error message.)

In Step S1, the new (version of an existing) webpage is received by the server.

In Step S2, the new webpage is assessed for its readiness for publication by checking its HTML for dependencies to other webpages. If there are none, then the new webpage proceeds directly to publication at Step S8. Otherwise, process flow continue to Step S3.

In Step S3, any dependent webpages are fetched using the HTTP request and HTTP response message sequence described further above.

In Step S4, it is tested whether each such dependency is satisfied.

In Step S5, the webpage is stored temporarily in a holding store awaiting resolution of its dependencies.

In Step S6, an external request is received for the webpage, which then triggers the process flow to return to Step S3, whereupon the checking is repeated. It is noted that the location of dependent websites are, e.g., stored after the first fetch, so that any subsequent fetches that are required take place more swiftly. In the meantime, the status quo continues, i.e., browsers are served the existing version of the webpage.

In Step S7, another option is shown in which after a certain delay, the webpage held in the holding store is submitted again to Step S3 to check if its dependencies are now resolved. This delay trigger could be instead of, or as well as, the trigger based on an external webpage request.

In Step S8, which follows if, e.g., the answer to Step S4 is 'YES', i.e. all dependencies are satisfied, the new webpage is permanently published, e.g. the new version is made available in place of the existing version, or the (entirely) new webpage is published.

It will thus be understood that the process flow has two entry points; Step S1 for a developer, and Step S6 for a user browsing to the page URL.

There could be additional methods of retrieving a webpage from the holding store. For example, consider the case of two webpages X and Y on web servers $PROD_A$ and $PROD_B$, respectively. Suppose that there is a mutual dependency between these two webpages, i.e. they are both dependent on each other. Suppose further that webpage X on $PROD_A$ has an as yet unpublished new version X' which is being held back from publication and stored in $PROD_A$'s holding store, because of an unresolved dependency to the (old version) of the dependent webpage Y on $PROD_B$. $PROD_B$ may be given permission to peek into, i.e. view, the holding store of $PROD_A$ and read the new version of the webpage X'. Through the peek into the holding store of $PROD_A$, $PROB_B$ can check the dependency of its own webpage Y to the as yet unpublished webpage X' on $PROD_A$. (Similarly, $PROD_B$ could also check the dependency to webpage X' of an as yet unpublished version of page Y, i.e. page Y'.) Then, if the mutual dependencies are met by some combination of version pairings between webpages X and Y, then it is safe to publish the newest mutually dependent pairing. For example, such a mutually dependent pair could be an as yet unpublished webpage X' on $PROD_A$ and an as yet unpublished webpage Y' on $PROD_B$, in which case $PROD_B$ would then be able to decide to publish the new version Y' of its webpage, which would then in time also cause $PROD_A$ to publish the new version of its webpage X'.

In this way, different web servers can check for mutual consistency (i.e., mutual satisfaction of dependencies) between two web pages at least one of which is dependent on the other, wherein at least one of the webpages is not yet published, but rather being kept in a holding store at its hosting web server.

Although the above examples have concentrated on a model in which a separate development server exists alongside a corresponding production server, similar to the environment of US 2013/0086323 A1, mentioned below and incorporated herein by reference in its entirety, it will be understood that aspects of the present invention can also be embodied in systems in which the production servers are directly updated, such as in US 2014/0250364 A1, mentioned below and incorporated herein by reference in its entirety, or where an individual updates one or more webpages, which have dependencies marked up, and then uploads these to the relevant web server for publishing.

US 2013/0086323A1 deals with the problem of how to coordinate content across cached replicas of a master web server which constitutes a central repository for content. When a page is updated on the master web server it propagates through to the caches. In the meantime, during the propagation phase, the caches are configured so as to prevent them from serving the now old versions of webpages to site visitors and also any webpages that have a dependency to the updated webpages. That is, the new publication results in a check for dependencies and all dependent webpages are prevented from being accessed by site visitors. Requests for these pages cause a fresh load of the new version of the webpage from the master web server.

US 2014/0250364 A1 describes a website system, where subject matter experts edit content on webpages of a live website, and their edits propagate through all dependent pages.

Additionally, US 2006/0212792 A1, incorporated herein by reference in its entirety, offers a solution to the problem of how to maintain coherency between data on different webpages by providing a rigid framework in which, as part of the website design, there is a specification of which webpages are bound to which webpage resources. The webpages bound together by this specification are then only made available for site visitors as an ensemble and only for so long as the specification is met. If, for example, one of the resources is taken down, then all other webpages of the ensemble are also taken down, and replaced with an earlier version of this ensemble which has a specification that does not include the removed resource. The website thus reverts to an earlier version of the website until such time as the specification can be met by a newer version.

In the examples described further above, publication of new page versions directly follows from determining that their dependencies are satisfied. If this is the case, then when multiple updates are being made from multiple sites, then the updates which have mutual dependencies may not all be exactly simultaneously published owing to message propagation times. In case of extreme time sensitivity, e.g. price sensitive information, and/or a major overhaul of interlinked websites involving updating perhaps thousands of pages, the above described methods could be modified so that what is referred to as 'publication' above, e.g. Step S8 of FIG. 8, is replaced by setting a flag indicating readiness to publish the new version which is externally visible, e.g. to a web master. The actual publication is then centrally initiated by the web master.

For example, referring to FIG. 7, imagine that an organization with four sites A to D is making a full relaunch of its interlinked websites. The new websites are fully specified and each development team is allocated a part of the work. A designated web master 36 can then view the readiness flags 34 over all four sites, and when all flags are positive, the web master can then send a publication date and time to clusters A to D, e.g. publish tomorrow at 07:00 GMT. A memory 35 for storing flags relating to as yet unpublished versions of webpages can be provided in each server, where this memory is accessible under restricted conditions, e.g. only to a web master or other staff with suitable permissions. It will also be appreciated that this web master function is suitable for automation if one of the clusters is designated as a web master cluster, the web master cluster can have the additional role of checking the flag memories of all participating clusters, and when all flags are set, can decide upon and distribute a publication date and time throughout the cluster group.

Figure 9:
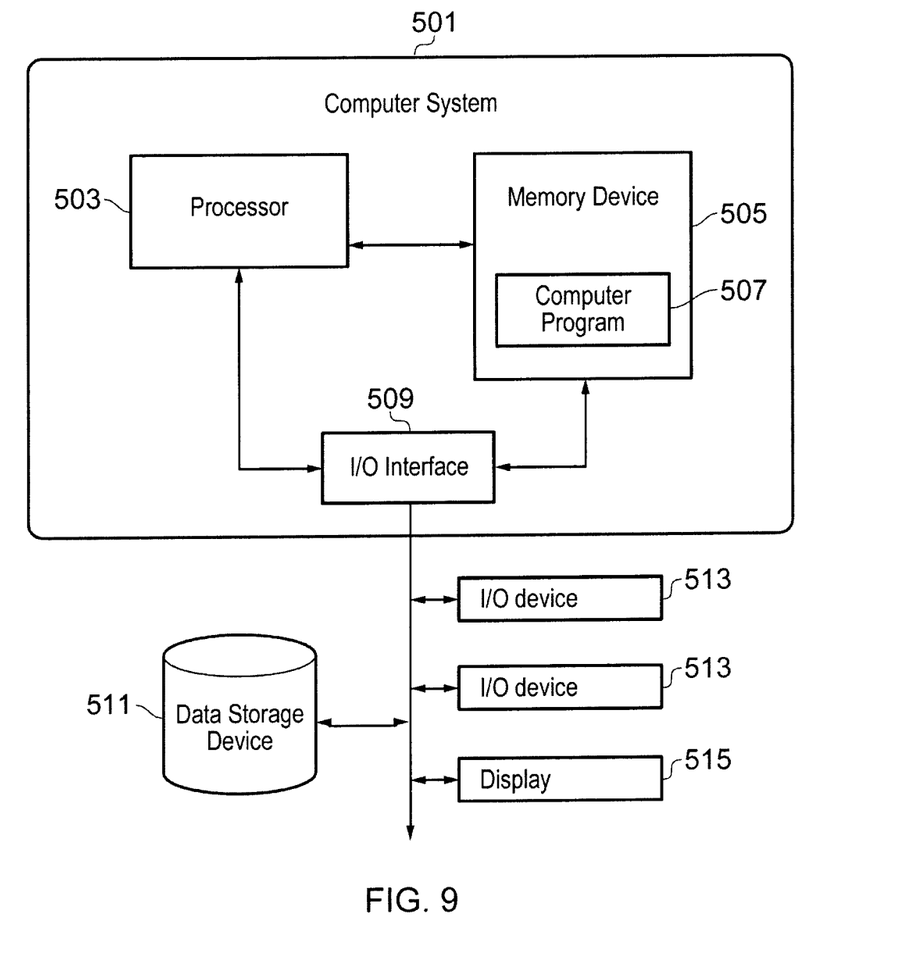
FIG. 9 shows a generic computer device capable of hosting computer programs embodying aspects of the invention.

FIG. 9 shows a structure of a computer system 501 and computer program 507 that may be used to implement the above-described methods and web servers embodying aspects of the present invention. The computer system 501 comprises a processor 503 coupled through one or more I/O Interfaces 509 to one or more hardware data storage devices 511 and one or more I/O devices 513, which can manage graphic object requests, and a display 515 on which the graphics objects can be displayed. The processor 503 may also be connected to one or more memory devices 505. At least one memory device 505 contains stored computer program 507, which is a computer program that comprises computer-executable instructions. The data storage devices 511 may store the computer program 507. The computer program 507 stored in the storage devices 511 is configured to be executed by processor 503 via the memory devices 505. The processor 503 executes the stored computer program 507.

Described herein is a solution to the specific issue encountered by, e.g., large organizations, who need to update multiple related websites and other web resources managed by different teams. In one embodiment, the solution recognizes and works with the distributed nature of the teams involved and their web presences.

According to one aspect, there is provided a computer automated method performed on a web server to manage the timing of publication of new webpages which are hosted by the web server. The method includes receiving a new webpage to make available for access; and processing the new webpage to assess its readiness for publication by: checking the new webpage for dependencies to other webpages; locating any of the other webpages on which the new webpage has dependencies (referred to herein as dependent webpages); and ascertaining whether each such dependency is satisfied, in which the new webpage is made available for access conditional on all dependencies being satisfied.

One aspect, when applied to new webpages that are new versions of existing webpages, provides a computer automated method performed on a web server to manage the timing of publication of new versions of webpages which are hosted by the web server. The method includes receiving a new version of an existing webpage to make available for access; and processing the new version to assess its readiness for publication by: checking the new version for dependencies to other webpages; locating any dependent webpages; and ascertaining whether each such dependency is satisfied, in which, if all dependencies are satisfied, the new version is made available for access in place of the existing version, else the web server continues to make available the existing version.

In one example, to implement one proposed solution, existing web servers are modified to provide a functionality for interpreting the dependency information embedded in a webpage's HTML and to withhold publication, i.e. go-live, of new webpages, such as new versions of existing webpages, until the dependency conditions which they specify in their HTML are satisfied.

The receiving the new webpage can trigger the server to process the new webpage to assess its readiness for publication. Instead or as well, receipt by the server of a page access request to a new webpage (such as a new, as yet unpublished version of an existing webpage), which is held by the server can trigger the server to process the new webpage to assess its readiness for publication.

In some cases, at least one of the dependencies can be to a webpage hosted by another web server and the locating and ascertaining involve sending an HTTP request to the other server and awaiting an HTTP response from the other server respectively. The HTTP response contains the HTML of the dependent webpage and the ascertaining of whether dependencies are satisfied is performed by the server through checking the dependent page's HTML. In some cases, at least one of the dependencies can be to a webpage hosted by the same web server.

In certain embodiments, access to the new webpages held by the server is restricted to the server itself. This reflects the fact that any new webpages which are not yet made available for external access are not yet live for the reason that they have unsatisfied dependencies, so should not be published, or the necessary or desired dependency checks have not yet been carried out. In some embodiments, although general external access by browsing remains forbidden, rights are given to selected other web servers to view the new, as yet unpublished webpages, so these other web servers can carry out dependency checking of their own pages with respect to the as yet unpublished webpages held on other partnered web servers, e.g. web servers belonging to the same large organization.

In some embodiments, a new webpage is made available for access responsive to all dependencies being satisfied. In other words, publication follows directly from determining that all dependencies are satisfied. In other embodiments, the new webpage is not immediately made available for access following a determination that all dependencies are satisfied, but rather a flag is set in the server indicating readiness for publication. Publication is delayed until such time as an instruction to publish is received. The purpose of the readiness flag is an indication by the server that it is ready to publish the relevant page. It is intended that the flag is externally visible to parties with the necessary or selected permissions, and one such external party can send a publish instruction to the web server.

According to another aspect, there is provided a web server for managing the timing of publication of new webpages which it hosts. The web server comprises a data repository for storing new webpages before they are made available for access externally; and a dependency processor operable to process a new webpage to assess its readiness for publication by: checking the new webpage for dependencies to other webpages; locating any dependent webpages; ascertaining whether each such dependency is satisfied; and, if all dependencies are satisfied, making available the new webpage for access One aspect, when applied to new webpages that are new versions of existing webpages, provides a web server for managing the timing of publication of new versions of webpages which it hosts which are to replace existing versions of those webpages. The web server comprises a data repository for storing new versions of existing webpages before they are made available for access externally; and a dependency processor operable to process a new version to assess its readiness for publication by: checking the new version for dependencies to other webpages; locating any dependent webpages; ascertaining whether each such dependency is satisfied; and, if all dependencies are satisfied, making available the new version for access in place of the existing version.

In certain embodiments, the dependency processor is triggered to process a new webpage to assess its readiness for publication in response to the data repository receiving a new webpage. In certain embodiments, the server receiving a page access request for a webpage for which a new, as yet unpublished version exists in the data repository, triggers the dependency processor to process a new version to assess its readiness for publication. In the case of rechecking whether dependencies are satisfied, not all processing steps will need to be repeated, since in principle the dependencies and their locations should already be known from the first processing event, i.e. it is ascertained whether each such dependency is satisfied.

In some embodiments, the server further comprises a flag memory operable to store a flag for each new, as yet unpublished webpage, each such flag indicating whether the associated new webpage is ready for publication, wherein each such flag is initially in an unset state when a new (version of a) webpage is first stored in the data repository and the dependency processor is operable to change a flag to a set state, once all dependencies of the associated new (version of the) webpage are satisfied, the web server being further operable to publish new webpages responsive to receipt of an instruction to publish. Alternatively, in other embodiments, the server is operable to make a new (version of a) webpage available for access responsive to all dependencies being satisfied.

According to yet a further aspect, there is provided a computer program stored on a computer readable medium and loadable into the internal memory of a digital computer, comprising software code portions, when said program is run on a computer, for performing the method of one or more aspects. According to yet another aspect, there is provided a computer program product storing the computer program.

It will be clear to one of ordinary skill in the art that all or part of the logical process steps of one or more of the embodiments may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of one or more of the embodiments may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, aspects of the present invention may be realized in the form of a computer implemented method of deploying a service comprising steps of deploying a computer program operable to, when deployed into a computer infrastructure and executed thereon, cause the computer system to perform the steps of the method.

It will be appreciated that the method and components of one or more embodiments may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing example embodiment without departing from the scope of aspects of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method to manage a timing of publication of webpages, the computer-implemented method comprising:

receiving at least one webpage to make available for access; and processing, by at least one web server, the at least one webpage to assess its readiness for publication, the processing comprising:

checking the at least one webpage for dependencies on other webpages;

locating one or more of the other webpages, based on the checking indicating dependencies, the dependencies comprising at least one mutual dependency between the at least one webpage and another webpage of the one or more of the other webpages; and ascertaining whether the dependencies are satisfied, wherein the at least one webpage is made available for access conditional on the dependencies being satisfied, resulting in satisfied dependencies and wherein the satisfied dependencies comprise content in the one or more of the other webpages being accessible.

2. The computer-implemented method of claim 1, wherein the at least one webpage comprises a new version of an existing webpage, and wherein, based on the dependencies being satisfied, the new version is made available for access in place of the existing webpage.

3. The computer-implemented method of claim 1, wherein processing of the at least one webpage to assess its readiness for publication is triggered by one of receiving the at least one webpage; and receipt of a page access request to the at least one webpage.

4. The computer-implemented method of claim 1, further comprising making the at least one webpage available for access based on the ascertaining indicating the dependencies being satisfied.

5. The computer-implemented method claim 1, further comprising refraining from making the at least one webpage available for access based on the ascertaining indicating the dependencies not being satisfied.

6. The computer-implemented method of claim 1, wherein at least one of the dependencies is to a webpage hosted by another web server of the at least one web server, and wherein the locating and the ascertaining include sending a HyperText Transfer Protocol (HTTP) request to the another web server and awaiting an HTTP response from the another web server, respectively.

7. The computer-implemented method of claim 6, wherein the HTTP response includes a HyperText Markup Language (HTML) of the webpage, and wherein the ascertaining whether the dependencies are satisfied is performed by the at least one web server through checking the HTML of the webpage.

8. The computer-implemented method of claim 1, wherein access to the at least one webpage is restricted to the at least one web server itself.

9. The computer-implemented method of claim 1, wherein the dependencies are described in HyperText Markup Language (HTML) using meta data tags.

10. The computer-implemented method of claim 1, wherein, based on satisfying the dependencies, the at least one webpage is not immediately made available for public access, but rather a flag is set indicating readiness for publication, and publication is delayed until an instruction to publish is received.

11. A computer program product for managing a timing of publication of new webpages, the computer program product comprising:
a computer readable storage medium readable by a processing circuit and storing instructions for execution by the processing circuit for performing a method comprising:
receiving a new webpage to make available for access; and
processing, by a web server, the new webpage to assess its readiness for publication, the processing comprising:
checking the new webpage for dependencies on other webpages;
locating one or more of the other webpages, based on the checking indicating dependencies, the dependencies comprising at least one mutual dependency between the at least one webpage and another webpage of the one or more of the other webpages; and
ascertaining whether the dependencies are satisfied, wherein the at least one webpage is made available for access conditional on the dependencies being satisfied, resulting in satisfied dependencies and wherein the satisfied dependencies comprise content in the one or more of the other webpages being accessible.

12. The computer program product of claim 11, wherein the at least one webpage comprises a new version of an existing webpage, and wherein, based on the dependencies being satisfied, the new version is made available for access in place of the existing webpage.

13. The computer program product of claim 11, wherein at least one of the dependencies is to a webpage hosted by another web server of the at least one web server, and wherein the locating and the ascertaining include sending a HyperText Transfer Protocol (HTTP) request to the another web server and awaiting an HTTP response from the another web server, respectively.

14. The computer program product of claim 11, wherein, based on satisfying the dependencies, the at least one webpage is not immediately made available for public access, but rather a flag is set indicating readiness for publication, and publication is delayed until an instruction to publish is received.

15. The computer program product of claim 11, further comprising:
making the at least one webpage available for access based on the ascertaining indicating the dependencies being satisfied; and
refraining from making the at least one webpage available for access based on the ascertaining indicating the dependencies not being satisfied.

16. A computer system for managing a timing of publication of new webpages, the computer system comprising:
a memory; and
a processor in communication with the memory, wherein the computer system is configured to perform a method, said method comprising:
receiving a new webpage to make available for access; and
processing, by a web server, the new webpage to assess its readiness for publication, the processing comprising:
checking the new webpage for dependencies on other webpages;
locating one or more of the other webpages, based on the checking indicating dependencies, the dependencies comprising at least one mutual dependency between the at least one webpage and another webpage of the one or more of the other webpages; and
ascertaining whether the dependencies are satisfied, wherein the at least one webpage is made available for access conditional on the dependencies being satisfied, resulting in satisfied dependencies and wherein the satisfied dependencies comprise content in the one or more of the other webpages being accessible.

17. The computer system of claim 16, wherein the at least one webpage comprises a new version of an existing webpage, and wherein, based on the dependencies being satisfied, the new version is made available for access in place of the existing webpage.

18. The computer system of claim 16, wherein at least one of the dependencies is to a webpage hosted by another web server of the at least one web server, and wherein the locating and the ascertaining include sending a HyperText Transfer Protocol (HTTP) request to the another web server and awaiting an HTTP response from the another web server, respectively.

19. The computer system of claim 16, wherein, based on satisfying the dependencies, the at least one webpage is not immediately made available for public access, but rather a flag is set indicating readiness for publication, and publication is delayed until such time as an instruction to publish is received.

20. The computer system of claim 16, further comprising:
  making the at least one webpage available for access based on the ascertaining indicating the dependencies being satisfied; and
  refraining from making the at least one webpage available for access based on the ascertaining indicating the dependencies not being satisfied.

\* \* \* \* \*